US007249013B2

(12) United States Patent
Al-Onaizan et al.

(10) Patent No.: US 7,249,013 B2
(45) Date of Patent: Jul. 24, 2007

(54) NAMED ENTITY TRANSLATION

(75) Inventors: Yaser Al-Onaizan, Elmsford, NY (US); Kevin Knight, Hermosa Beach, CA (US)

(73) Assignee: University of Southern California, Los Angeles, CA (US)

( * ) Notice: Subject to any disclaimer, the term of this patent is extended or adjusted under 35 U.S.C. 154(b) by 905 days.

(21) Appl. No.: 10/387,032

(22) Filed: Mar. 11, 2003

(65) Prior Publication Data

US 2003/0191626 A1    Oct. 9, 2003

Related U.S. Application Data

(60) Provisional application No. 60/363,443, filed on Mar. 11, 2002.

(51) Int. Cl.
*G06F 17/27* (2006.01)
*G06F 17/28* (2006.01)
(52) U.S. Cl. .............................. 704/9; 704/2; 704/277
(58) Field of Classification Search ............... None
See application file for complete search history.

(56) References Cited

U.S. PATENT DOCUMENTS

| | | | |
|---|---|---|---|
| 5,212,730 A | | 5/1993 | Wheatley et al. |
| 5,432,948 A | | 7/1995 | Davis et al. |
| 5,477,451 A | | 12/1995 | Brown et al. |
| 5,819,265 A | * | 10/1998 | Ravin et al. .................. 707/5 |
| 6,311,152 B1 | | 10/2001 | Bai et al. |
| 6,460,015 B1 | * | 10/2002 | Hetherington et al. ......... 704/8 |
| 6,810,374 B2 | * | 10/2004 | Kang ............................ 704/2 |
| 7,107,215 B2 | * | 9/2006 | Ghali ........................ 704/257 |

OTHER PUBLICATIONS

Arabi et al., "Algorithms for Arabic Name Transliteration", IBM Journal of Research Development, vol. 38, No. 2, Mar. 1994, pp. 183-193.*
Meng et al., "Generating phonetic cognates to handle named entities in English-Chinese cross-language spoken document retrieval", IEEE Workshop on Automatic Speech Recognition and Understanding, 2001, pp. 311-314.*
PCT International Search Report, Jun. 25, 2003.
Knight, K., "A Statistical MT Tutorial Workbook," Published on the Web, Aug. 1999.
Al-Onaizan, Y. and Knight K., Named Entity Translation: Extended Abstract, Proceedings of HLT-02. San Diego, 2002.
Al-Onaizan, Y. and Knight K., "Translating Named Entities Using Monolingual and Bilingual Resources," Proceedings of Conference of the Association for Computational Linguistics (ACL)-02. Philadelphia, 2002.

(Continued)

*Primary Examiner*—David Hudspeth
*Assistant Examiner*—Brian Albertalli
(74) *Attorney, Agent, or Firm*—Carr & Ferrell LLP

(57) ABSTRACT

Translating named entities from a source language to a target language. In general, in one implementation, the technique includes: generating potential translations of a named entity from a source language to a target language using a pronunciation-based and spelling-based transliteration model, searching a monolingual resource in the target language for information relating to usage frequency, and providing output including at least one of the potential translations based on the usage frequency information.

27 Claims, 5 Drawing Sheets

OTHER PUBLICATIONS

Al-Onaizan, Y. and Knight K., "Machine Transliteration of Names in Arabic Text," Proceedings of ACL Workshop on Computational Approaches to Semitic Languages. Philadelphia, 2002.

Yamada, K. and Knight, K., "A Decoder for Syntax-Based Statistical MT," Proceedings of ACL-02. Philadelphia, 2002.

Yamada, K. and Knight, K., "A Syntax-Based Statistical Translation Model," Proceedings of ACL-01. Toulouse, France, 2001.

Germann, U., Jahr, M., Knight, K., Marcu, D., and Yamada, K., "Fast Decoding and Optimal Decoding for Machine Translation," Proceedings of ACL-01. Toulouse, France, 2001.

Marcu, D., "Towards a Unified Approach to Memory- and Statistical-Based Machine Translation," Proceedings of ACL-01. Toulouse, France, 2001.

Germann, U., "Building a Statistical Machine Translation System from Scratch: How Much Bang Can We Expect for the Buck," Proceedings of the Data-Driven MT Workshop of ACL-01. Toulouse, France, 2001.

Koehn, P. and Knight, K., "Knowledge Source for Word-Level Translation Models," Empirical Methods in Natural Language Processing conference (EMNLP'01), 2001.

Al-Onaizan, Y., Germann, U., Hermjakob, U., Knight, K., Koehn, P., Marcu, D., and Yamada, K., "Translating with Scarce Resources," American Association for Artificial Intelligence Conference (AAAI'00), 2000.

Koehn, P., and Knight, K., "Estimating Word Translation Probabilities from Unrelated Monolingual Corpora Using the EM Algorithm," American Association for Artificial Intelligence Conference (AAAI'00), 2000.

Knight, K. and Marcu, D., "Statistics-Based Summarization—Step One: Sentence Compression," American Association for Artificial Intelligence Conference (AAAI'00), 2000.

Al-Onaizan, Y., Curin, J., Jahr, M., Knight, K., Lafferty, J., Melamed, D., Och, F.-J., Purdy, D., Smith, N. A., and Yarowsky, D., "Statistical Machine Translation, Final Report," JHU Workshop 1999. Technical Report, CLSP/JHU, 1999.

Knight, K., "Decoding Complexity in Word-Replacement Translation Models," Computational Linguistics, 25(4), 1999.

Knight, K. and Yamada, K., "A Computational Approach to Deciphering Unknown Scripts," Proceedings of the ACL Workshop on Unsupervised Learning in Natural Language Processing, 1999.

Knight, K. and Al-Onaizan, Y., "Translation with Finite-State Devices," Proceedings of the 4th AMTA Conference, 1998.

Stalls, B. and Knight, K., "Translating Names and Technical Terms in Arabic Text," COLING/ACL Workshop on Computational Approaches to Semitic Languages. Montreal, Quebéc, 1998.

Knight, K. "Automating Knowledge Acquisition for Machine Translation," AI Magazine 18(4), 1997.

Knight, K. and Graehl, J., "Machine Transliteration," Proceedings of the ACL-97. Madrid, Spain, 1997.

Knight, K. "Learning Word Meanings by Instruction," Proc. of the National on Artificial Intelligence (AAAI), 1996.

Knight, K. and Hatzivassiloglou, V., "Two-Level, Many-Paths Generation," Proc. of the Conference of the Association for Computational Linguistics (ACL), 1995.

Knight, K., Chander, I., Haines, M., Hatzivassiloglou, V., Hovy, E., Iida, M., Luk, S., Whitney, R., and Yamada, K., "Filing Knowledge Gaps in a Broad-Coverage Machine Translation System," Proc. of the International Joint Conference on Artificial Intelligence (IJCAI), 1995.

Hatzivassiloglou, V. and Knight, K., "Unification-Based Glosssing," Proc. of the International Joint Conference on Artificial Intelligence (IJCAI), 1995.

Knight, K., Chander, I., Haines, M., Hatzivassiloglou, V., Hovy, E., Iida, M., Luk, S., Okumura, A., Whitney, R., Yamada, K., "Integrating Knowledge Bases and Statistics in MT," Proc. of the Conference of the Assoication for Machine Translation in the Americas (AMTA), 1994.

Knight, K. and Luk, S., "Building a Large-Scale Knowledge Base for Machine Translation," Proc. of the National Conference on Artificial Intelligence (AAAI), 1994.

Knight, K. and Chander, I., "Automated Postediting of Documents," Proc. of the National Conference on Artificial Intelligence (AAAI), 1994.

Langkilde, I. and Knight, K., "Generation that Exploits Corpus-based Statistical Knowledge," Proc. of the Conference of the Association for Computational Linguistics (COLING/ACL), 1998.

Langkilde, I. and Knight, K., "The Practical Value of N-Grams in Generation," Proc. of the International Natural Language Generation Workshop, 1998.

"Unification," The Encyclopedia of Artificial Intelligence, Second Edition, John Wiley and Sons, 1992.

Knight, K. "Integrating Knowledge Acquisition and Language Acquisition," Applied Intelligence, 1(1), 1992.

E. Rich and K. Knight, "Artificial Intelligence, Second Edition," McGraw-Hill Book Company, 1991.

Knight, K. "Connectionist Ideas and Algorithms," Communications of the ACM, 33(11), Nov. 1990.

Barnett, J., Knight, K., Mani, I., and Rich, E., "Knowledge and Natural Language Processing," Communications of the ACM, 33(8), Aug. 1990.

Knight, K. "Unification: A Multidisciplinary Survey," ACM Computing Surveys, 21(1), 1989.

Bikel, D., Schwartz, R., and Weischedel, R., "An Algorithm that learns What's in a Name," Machine Learning 34, 211-231 (1999).

Brown, P., Della-Pietra, S., Della-Pietra, V., and Mercer, R., "The Mathematics of Statistical Machine Translation: Parameter Estimation," Computational Linguistics, 19(2) (1993).

Chinchor, N., "MUC-7 Named Entity Task Definition," In Proceedings of the 7th Message Understanding Conference (1997).

Stalls, B. and Knight, K., "Translation Names and Technical Terms in Arabic Text," Proceedings of the COLING/ACL Workshop on Computational Approaches to Semitic Languages (1998).

Yamada, K., "A Syntax-based Statistical Translation Model, A Dissertation," University of Southern California, Dec. 2002.

Sun, J., Gao, J., Zhang, L., Zhou, M., and Huang, C., "Chinese Named Entity Identification Using Class-based Language Model."

Mikheev, A., Moens, M., and Grover, C., "Named Entity Recognition without Gazetteers," University of Edinburgh, England.

* cited by examiner

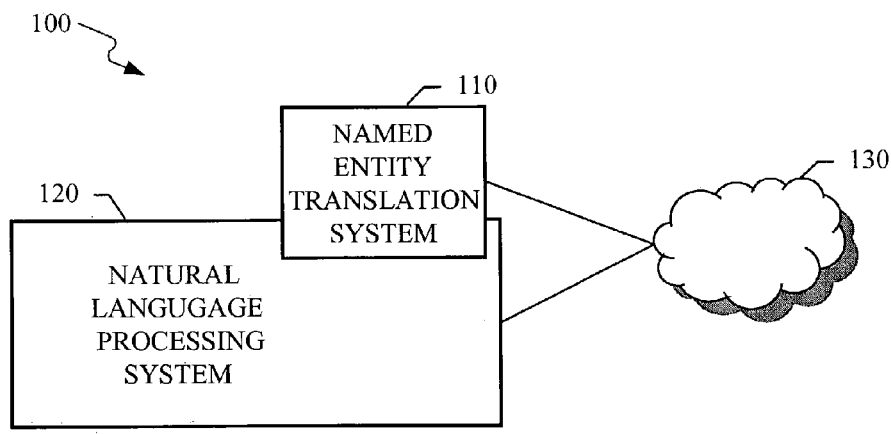
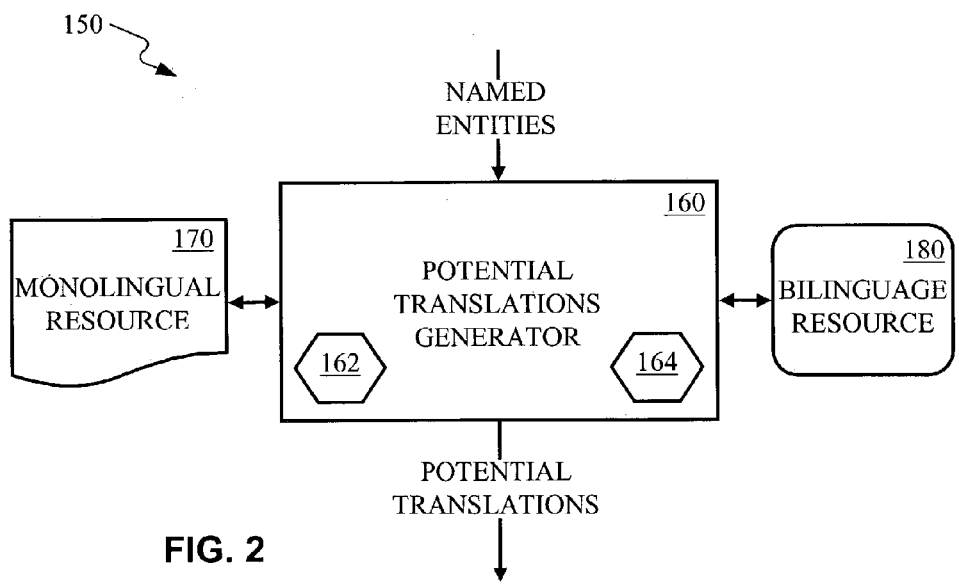
FIG. 1
FIG. 2

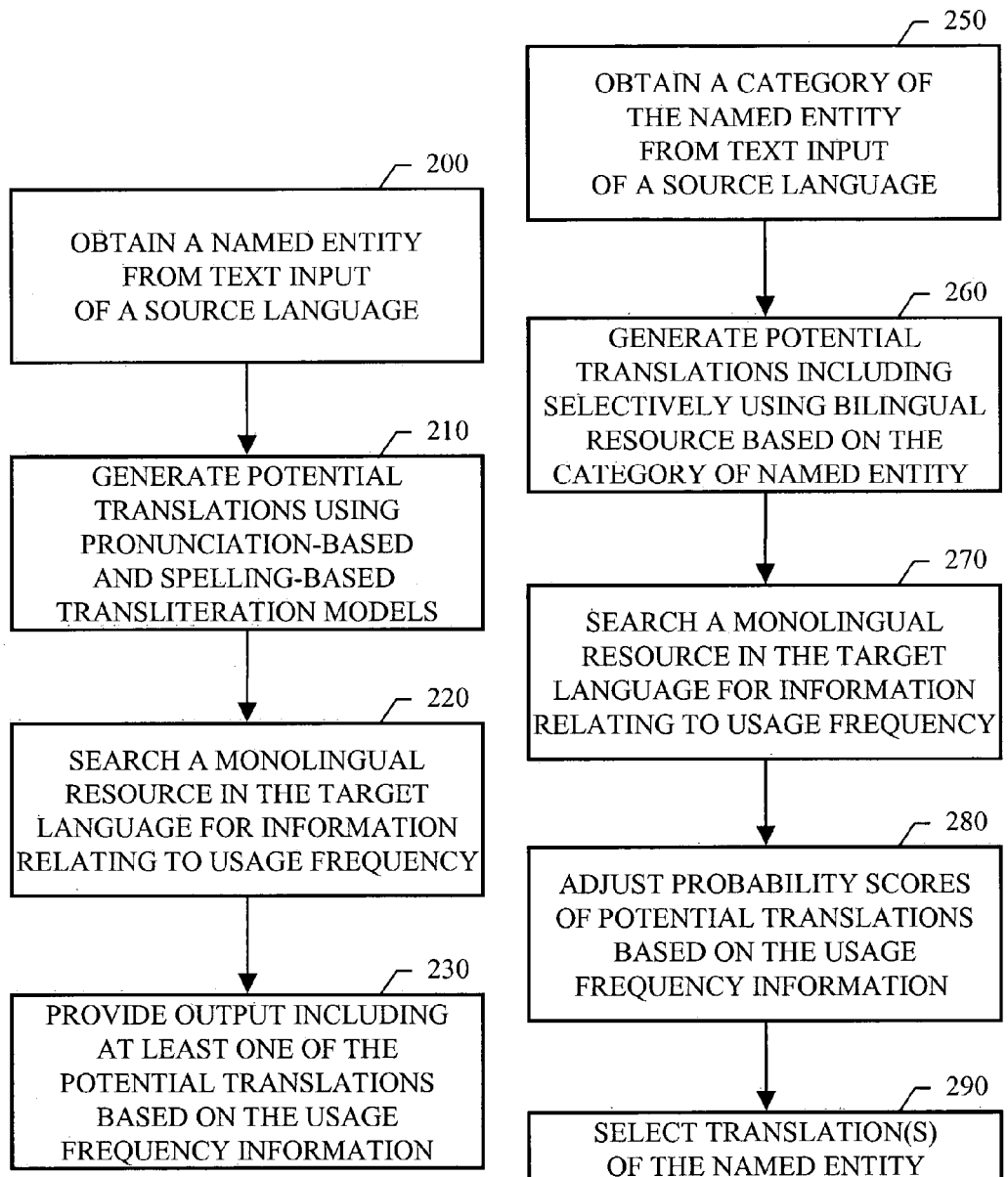

NAMED ENTITY TRANSLATION

CROSS REFERENCE TO RELATED APPLICATIONS

This application claims the benefit of the priority of U.S. Provisional Application Ser. No. 60/363,443, filed Mar. 11, 2002 and entitled "NAMED ENTITY TRANSLATION".

STATEMENT AS TO FEDERALLY SPONSORED RESEARCH

The invention described herein was made in the performance of work under Defense Advanced Research Projects Agency (DARPA) grant no. N66001-00-1-8914, pursuant to which the Government has certain rights to the invention, and is subject to the provisions of Public Law 96-517 (35 U.S.C. 202) in which the contractor has elected to retain title.

BACKGROUND

The present application describes systems and techniques relating to machine translation of languages, for example, translation of named entities.

Named entity phrases are being introduced in news stories on a daily basis in the form of personal names, organizations, locations, temporal phrases, and monetary expressions. Various techniques to identify named entities have been made available.

SUMMARY

The present disclosure includes systems and techniques relating to translating named entities from a source language to a target language. According to an aspect, potential translations of a named entity from a source language to a target language are generated using a pronunciation-based and spelling-based transliteration model. A monolingual resource in the target language can be searched for information relating to usage frequency, and output including at least one of the potential translations can be provided based on the usage frequency information.

A bilingual resource can be used selectively in conjunction with a combined pronunciation-based and a spelling-based transliteration model and a news corpus, allowing named entity translation to be performed with minimal input from bilingual resources. Usage context information and/or identified sub-phrases of potential translations can be used to expand a list of translation candidates generated. Moreover, one or more monolingual clues can be used to help re-rank generated translation candidates. The systems and techniques described can result in effective named entity translation, able to handle entirely new named entity phrases and domain specific named entities, which may not be found in bilingual dictionaries.

DRAWING DESCRIPTIONS

FIG. 1 illustrates a system using named entity translation.

FIG. 2 illustrates an exemplary named entity translation system.

FIG. 3 illustrates machine-based production of potential translations for a named entity.

FIG. 4 illustrates machine-based production of potential translations for a named entity, including the use of a bilingual resource.

Figure 5:
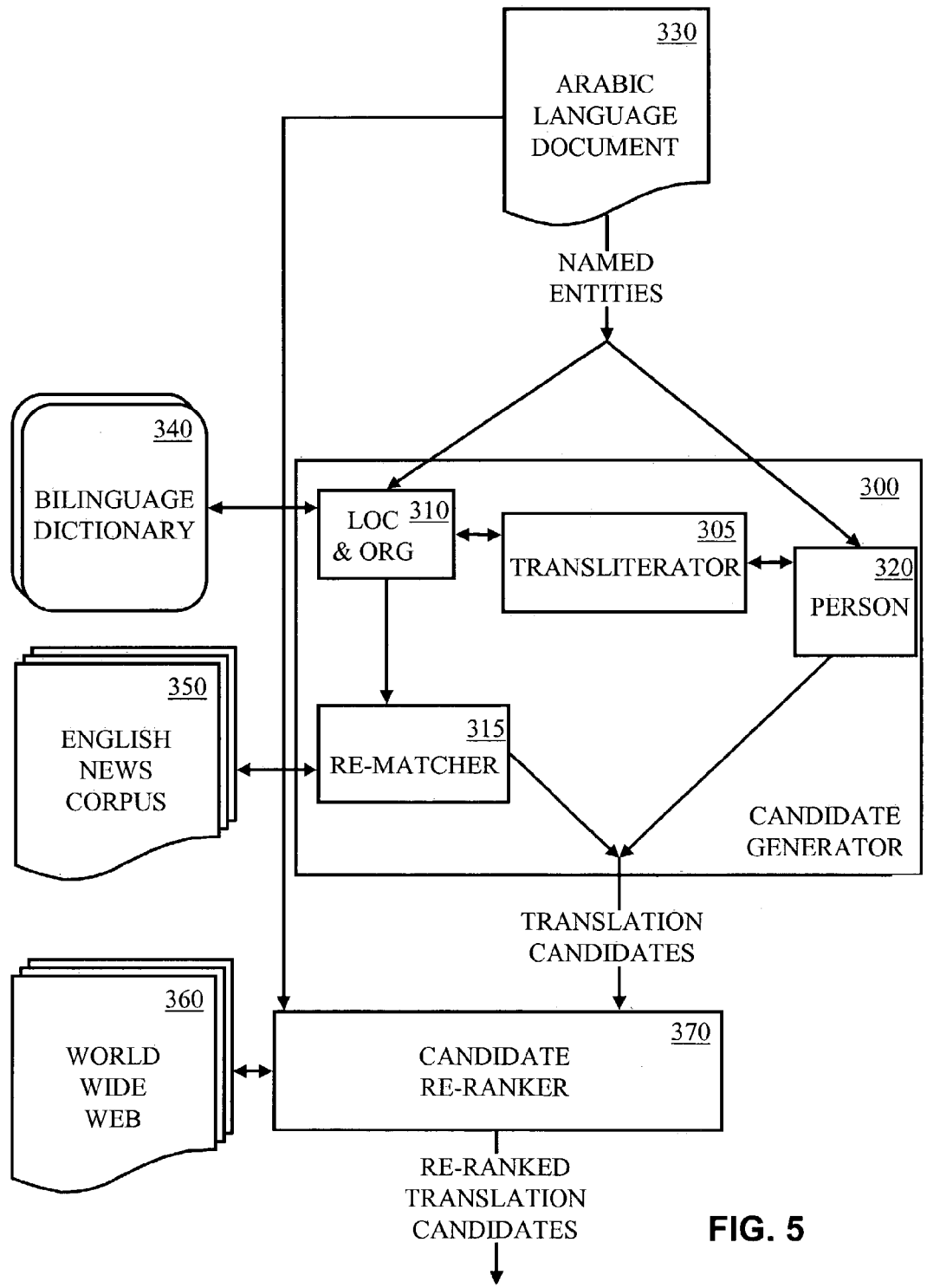
FIG. 5 illustrates an exemplary named entity translation system.

Details of one or more embodiments are set forth in the accompanying drawings and the description below. Other features and advantages may be apparent from the description and drawings, and from the claims.

DETAILED DESCRIPTION

As used herein, the terms "named entity", "named entity phrase" and "phrase" are used interchangeably. A named entity is a group of one or more words that identifies an entity by name. For example, named entities may include persons, organizations, locations, dates, and monetary expressions. Additionally, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files. The term "text" means character data, which may be encoded using a standardized character encoding scheme, such as Unicode, ASCII, Arabic (ISO), Turkish (ISO), Chinese Simplified (EUC), Korean (ISO), etc.

FIG. 1 illustrates a system 100 using named entity translation. The system 100 includes a natural language processing (NLP) system 120, such as a statistical machine translation system, a Cross-Lingual Information Retrieval (CLIR) system or a Question Answering (QA) system. The NLP system 120 can have a built-in named entity translation system 110. Alternatively, the NLP system 120 can be in communication with the named entity translation system 110, such as by through a network 130.

The named entity translation system 110 can be a tool that translates named entities in support of the NLP system 120. Machine translation systems can use the system 110 as a component to handle phrase translation in order to improve overall translation quality. CLIR systems can identify relevant documents based on translations of named entity phrases provided by the system 110. QA systems can benefit from the system 110 because the answer to many factoid questions involve named entities (e.g., answers to "who" questions usually involve Persons/Organizations, "where" questions involve Locations, and "when" questions involve Temporal Expressions).

FIG. 2 illustrates an exemplary named entity translation system 150. Named entities in a source language are provided to a potential translation generator 160. The generator 160 uses a pronunciation-based transliteration model 162 and a spelling-based transliteration model 164 to generate potential translations from the source language to a target language. In doing so, a monolingual resource 170 (e.g., English language documents available over a communications network) can be used to help decide which one or more potential translations are provided as output.

In addition, a bilingual resource 180 can also be used to help decide which one or more potential translations are provided as output. The bilingual resource 180 can be a bilingual dictionary (e.g., an Arabic-English dictionary).

The following example is used to illustrate the general approach to translation that inspires the specific systems and techniques described herein. Although the present disclosure frequently uses Arabic and English as the source and target languages respectfully, the system and techniques described are applicable to other languages as well.

The frequency of named-entity phrases in news text reflects the significance of the events with which they are associated. When translating named entities in news stories of international importance, the same event will frequently be reported in many languages including the target language. Instead of having to come up with translations for the named entities often with many unknown words in one document, sometimes it is easier for a human to find a document in the target language that is similar to, but not necessarily a translation of, the original document and then extract the translations.

To illustrate this approach to translation consider the named entities that appear in the following Arabic excerpt:

2001م من ابريل‏نيسان‏وحتى نوفمبر‏تشرين

البحث الحاليتين في مقاطعتي اونسان وكوجانج الواقعتين

96 كيلومترا تقريباشمالي بيونغ يانغ . الثاني حول خزان تشوزين وفي منطقتي‎ ،‏ ‎عشر‏ عمليات‏ عام ‏وستجر‏ي

على بعد

The Arabic newspaper article from which this excerpt was extracted is about negotiations between the US and North Korean authorities regarding the search for the remains of US soldiers who died during the Korean war. When the Arabic document was translated by a bilingual speaker, the locations, "خزان تشوزين", "اونسان", and "كوجانج", were sounded out to give Chozin Reserve, Onsan, and Kojanj, respectively.

When translating unknown or unfamiliar names, one can search for an English document that discusses the same subject and then extract the translations. Thus, to translate the terms above, one can search the World Wide Web (WWW) using the following terms: "soldiers remains", "search", "North Korea", and "US". When this search was performed using a search engine (e.g., http://www-google-com), the highest ranked document contained the following paragraph:

The targeted area is near Unsan, which saw several battles between the U.S. Army's 8th Cavalry regiment and Chinese troops who launched a surprise offensive in late 1950.

This allowed the creation of a more precise query by adding "Unsan" to the search terms.

When this search was performed, and the originally found document excluded from the results, the highest ranked document contained the following excerpt:

Operations in 2001 will include areas of investigation near Kaechon, approximately 18 miles south of Unsan and Kujang. Kaechon includes an area nicknamed the "Gauntlet," where the U.S. Army's 2nd Infantry Division conducted its famous fighting withdrawal along a narrow road through six miles of Chinese ambush positions during November and December 1950. More than 950 missing in action soldiers are believed to be located in these three areas.

The Chosin Reservoir campaign left approximately 750 Marines and soldiers missing in action from both the east and west sides of the reservoir in northeastern North Korea.

Thus, this human translation method gives the correct translation for the names of interest. By using this human translation method as a starting point, various machine-based named entity translation techniques can be provided.

FIG. 3 illustrates machine-based production of potential translations for a named entity. A named entity is obtained from text input of a source language at 200. The named entity can be identified or received as input. Identification of the named entity can be performed using traditional techniques, such as the IdentiFinder named entity identifier described in Daniel M. Bikel, Richard Schwartz, and Ralph M. Weischedel, "An Algorithm that learns What's in a Name", Machine Learning 34, 211-231 (1999). Moreover, phrase boundaries and a category designation for the named entity can be obtained.

Potential translations of the named entity from the source language to a target language are generated using a pronunciation-based transliteration model and a spelling-based transliteration model at 210. This generation of potential translation can involve the following: (1) using a first probabilistic model to generate words in the target language and first transliteration scores for the words based on language pronunciation characteristics, (2) using a second probabilistic model to generate second transliteration scores for the words based on a mapping of letter sequences from the target language into the source language, and (3) combining the first transliteration scores and the second transliteration scores into third transliteration scores for the words.

Transliteration is the process of replacing words in the source language with their approximate phonetic or spelling equivalents in the target language. Transliteration between languages that use similar alphabets and sound systems can be easier than transliteration between languages with significant differences in their sound and writing systems, such as the case with Arabic into English.

Vowels in Arabic come in two varieties: long vowels and short vowels. Short vowels are rarely written in Arabic in newspaper text, which makes pronunciation and meaning highly ambiguous. Also, there is no one-to-one correspondence between Arabic sounds and English sounds. For example, English "P" and "B" are both mapped into Arabic "ب"; Arabic "ح" and "ه" are mapped into English "H"; and so on.

One approach to this problem is to use a pronunciation-based model during translation from Arabic to English. In a paper by Bonnie G. Stalls and Kevin Knight, "Translating names and technical terms in Arabic text", Proceedings of the COLING/ACL Workshop on Computational Approaches to Semitic Languages (1998), an Arabic-to-English back-transliteration system based on the source-channel framework is presented. The transliteration process is based on a generative model of how an English name is transliterated into Arabic. This process consists of several stages that can each be defined as a probabilistic model represented as a finite state machine.

First, an English word is generated according to its unigram probabilities P(w). Then, the English word is pronounced with probability P(e|w), which can be collected directly from an English pronunciation dictionary. Finally, the English phoneme sequence is converted into Arabic writing with probability P(a|e). According to this model, the transliteration probability can be governed by the following equation:

$$P_p(w|a) \cong \sum_{\forall e} P(w)P(e|w)P(a|e) \qquad (1)$$

This pronunciation-based model can also be referred to as a phonetic-based model.

The transliterations proposed by this model are generally accurate, but typically, the English words that can be produced are those with known pronunciations. Moreover, human translators often transliterate words based on how they are spelled and not based on how they are pronounced. For example, "Graham" is transliterated into Arabic as "غراهام" and not as "غرام". To address this issue, a spelling-based model can be used in addition to the pronunciation-based model.

An example spelling-based probabilistic model can directly map English letter sequences into Arabic letter sequences with probability P(a|w), which can be trained on a small English/Arabic name list without a need for English pronunciations. Since no pronunciations are needed, this list is easily obtainable for many language pairs. Moreover, the model P(w) can be extended to include a letter trigram model in addition to the word unigram model. This makes it possible to generate words that are not already defined in the word unigram model. The transliteration score according to this model can thus be governed by the following equation:

$$P_s(w|a) \cong P(w)P(a|w) \qquad (2)$$

The phonetic-based and spelling-based models described above can be combined into a single transliteration model. In this combined model, the transliteration score for an English word w given an Arabic word a can be a linear combination of the phonetic-based and the spelling-based transliteration scores as governed by the following equation:

$$P(w|a) = \lambda P_s(w|a) + (1-\lambda)P_p(w|a) \qquad (3)$$

In addition to the first and second probabilistic models described above, other techniques can be used during the generation of the potential translations. Generating the potential translations can involve using a bilingual resource. Generating the potential translations can involve multiple generation stages. For example, in a first stage, an initial set of potential translations (also referred to as candidates) can be generated, and then this set can be expanded using search and transliteration techniques, including the transliteration techniques described above.

A monolingual resource in the target language is searched to find information relating to usage frequency at 220. For example the monolingual resource can be multiple documents, such as news stories in the target language, that are available over a communications network. These documents can be searched for the potential translations to identify which potential translations are more likely to be accurate translations.

Output that includes at least one of the potential translations is provided based on the usage frequency information at 230. For example, the potential translations can have associated probability scores, and these probability scores can be adjusted based on the usage frequency information. The adjusted probability scores can then affect the output provided.

FIG. 4 illustrates machine-based production of potential translations for a named entity, including the use of a bilingual resource. A category of an identified named entity is obtained at 250. Potential translations of the named entity can then be generated by selectively using a bilingual resource based on the category at 260. Different types of named entities can be translated differently based on one or more identified categories.

Numerical and temporal expressions typically use a limited set of vocabulary words (e.g., names of months, days of the week, etc.), and can be translated using various translation techniques. Names of persons can be a first category and handled separately from locations and organizations, which can be treated as a second category.

When a named entity falls in the first category, the bilingual resource need not be used. Person names are almost always transliterated by human translators. Thus, the translation candidates for typical person names can be generated using the combined pronunciation-based and spelling-based model already described. Finite-state devices can produce a lattice containing all possible transliterations for a given name. The candidate list can then be created by extracting the n-best transliterations for a given name. The score of each candidate in the list can be the transliteration probability as given by $P(w|a) = \lambda P_s(w|a) + (1-\lambda)P_p(w|a)$. For example, the name "بيل كلينتون" is transliterated into: "Bell Clinton", "Bill Clinton", "Bill Klington", etc.

When a named entity falls in the second category, the bilingual resource can be used. Words in organization and location names are typically either translated directly (e.g., "تشوزين" as "Reservoir") or transliterated (e.g., "خزان" as "Chosin") by human translators, and it is not always clear when one approach is better for a given word than another. So to generate translation candidates for a given phrase f, words in the phrase can be translated using a bilingual dictionary and also transliterated using the techniques described above.

The candidate generator can combine the dictionary entries and n-best transliterations for each word in the given phrase into a regular expression that accepts all possible permutations of word translation/transliteration combinations. In addition to the word transliterations and direct translations, English zero-fertility words (i.e., words that might not have Arabic equivalents in the named entity phrase, such as "of" and "the") can be considered. This regular expression can then be matched against a monolingual resource in the target language, such as a large English news corpus.

All matches can be scored according to their individual word translation/transliteration scores. The score for a given candidate e can be given by a modified version of the Model 1 probability described in P. F. Brown, S. A. Della-Pietra, V. J. Della-Pietra, and R. L. Mercer, "The mathematics of statistical machine translation: Parameter estimation", Computational Linguistics, 19(2) (1993), as follows:

$$P(e|f) = \alpha \sum_{\forall a} P(e,a|f) \qquad (4)$$

$$= \alpha \sum_{a_1=0}^{l} \cdots \sum_{a_m=0}^{l} \prod_{j=0}^{m} t(e_{a_j}|f_j) \qquad (5)$$

where l is the length of e, m is the length of f, α is a scaling factor based on the number of matches of e found, and $a_j$ is the index of the English word aligned with $f_j$ according to alignment a. The probability $t(e_{a_j}|f_j)$ is a linear combination of the transliteration and translation score, where the translation score is a uniform probability over all dictionary entries for $f_j$.

The scored matches form the list of translation candidates. For example, the candidate list for "خليج الخنازير" includes "Bay of Pigs" and "Gulf of Pigs".

A monolingual resource in the target language is searched to find information relating to usage frequency at 270. Probability scores of the generated potential translations can be adjusted based on the usage frequency information at 280. This adjustment represents a re-scoring of the translation candidates based on usage frequency information discovered in the monolingual resource, such as the Web. Although the Web includes documents in multiple languages, it is treated as a monolingual resource for the purposes of the search at 270. The Web is thus a monolingual resource in this context.

The re-scoring of the potential translations can be based on different types of usage frequency information. The usage frequency information can be normalized full-phrase hit counts for the potential translations in the monolingual resource, and adjusting the probability scores can involve multiplying the probability scores by the normalized full-phrase hit counts for the potential translations. One or more additional types of re-scoring can be used with one or more monolingual resources, as described further below in connection with FIG. 5.

After the re-scoring, one or more of the translation candidates are selected based on the adjusted probability scores at 290. For example, a best available translation of the named entity can be selected from the potential translations based on the adjusted probability scores. Alternatively, a list of likely translations of the named entity can be selected from the potential translations based on the adjusted probability scores and a threshold. These one or more selected translations can be provided as output to an NLP system.

FIG. 5 illustrates an exemplary named entity translation system. As shown in FIG. 5, the translation process can involve two main stages. Given a named entity in the source language, a ranked list of translation candidates is generated using bilingual and monolingual resources. Then, the list of candidates can be re-scored using different monolingual clues.

A candidate generator 300 produces translation candidates for named entities using the techniques described above. The candidate generator 300 received named entities that have been identified in an Arabic document 330. The named entities that are identified as locations or organizations are processed by a first module 310, and the named entities that are identified as person names are processed by a second module 320. Both modules 310, 320 use a transliterator 305, as described above.

Moreover, the first module 310 also uses a bilingual dictionary 340 to generate a regular expression that accepts all possible permutations of word translation/transliteration combinations. The first module 310 can add English zero-fertility words to the regular expression as well. This regular expression is then matched against an English news corpus 350 by a re-matcher 315. The matches are scored according to their individual word translation/transliteration scores.

For a given named entity, a list of translation candidates are output by the candidate generator. These translation candidates can be further processed by a candidate re-ranker 370 before a final set of re-ranked translation candidates are output. The re-ranker 370 searches the Web 360 or some other information source to find information relating to usage frequency. The re-ranker 370 then re-scores the translation candidates based on the discovered usage frequency information.

Multiple types of usage frequency information and corresponding re-scoring techniques can be used. In general, the candidates are re-ranked according the following equation for score, S:

$$S_{new}(c) = S_{old}(c) \times RF(c) \qquad (6)$$

where $RF(c)$ is the re-scoring factor used. The multiple re-scoring techniques can be combined and applied incrementally, where the re-ranked list of one module is the input to the next module, and the candidates list can be limited in size. For example, the re-ranker 370 can include three separate re-scoring modules that apply different re-scoring factors, and a list of twenty potential translations can be re-ranked in turn by each of these three modules.

A first possible re-scoring factor is a normalized straight Web count. For the "بيل كلينتون" example, the top two translation candidates are "Bell Clinton" with a transliteration score of $1.1 \times 10^{-9}$ and "Bill Clinton" with a score of $6.7 \times 10^{-10}$. The Web frequency counts of these two names are 146 and 840,844 respectively. Using Equation 6, these Web counts result in revised scores of $1.9 \times 10^{-13}$ and $6.68 \times 10^{-10}$, respectively, which leads to the correct translation being ranked highest.

Considering counts for the full name rather than the individual words in the name generally produces better results. To illustrate this point consider the person name "جون كيل". The transliteration module 305 proposes "Jon" and "John" as possible transliterations for the first name, and "Keele" and "Kyl" among others for the last name. The normalized counts for the individual words are: ("John", 0.9269), ("Jon", 0.0688), ("Keele", 0.0032), and ("Kyl", 0.0011). Using these normalized counts to score and rank the first name/last name combinations in a way similar to a unigram language model results in the following name/score pairs: ("John Keele", 0.003), ("John Kyl", 0.001), ("Jon Keele", 0.0002), and ("Jon Kyl", $7.5 \times 10^{-5}$). However, the normalized phrase counts for the possible full names are: ("Jon Kyl", 0.8976), ("John Kyl", 0.0936), ("John Keele", 0.0087), and ("Jon Keele", 0.0001), which is more desirable as "Jon Kyl" is an often-mentioned US Senator.

Another possible re-scoring factor is based on co-reference in the source input, in which adjusting the probability scores involves comparing the named entity with other named entities of a common type in the text input, and if the named entity is a sub-phrase of one of the other named entities, adjusting the probability scores based on normalized full-phrase hit counts corresponding to the one other named entity. When a named entity is first mentioned in a news article, typically the full form of the phrase (e.g., the full name of a person) is used. Later references to the name often use a shortened version of the name (e.g, the last name of the person).

Shortened versions of a named entity phrase are more ambiguous by nature than the full version of the phrase and hence more difficult to translate. Also, longer phrases tend to have more accurate Web counts than shorter ones. For example, the phrase "مجلس النواب" is translated as "the House of Representatives". The word "المجلس" might be used for later references to this phrase. Note that "المجلس" is the same word as "مجلس" but with the definite article "ال" attached. Thus, the translating machine has the task of translating "المجلس", which is ambiguous and could refer to a number of things including: "the Council" when referring to "مجلس الأمن" ("the Security Council"); "the House" when referring to "مجلس النواب" ("the House of Representatives"); and as "the Assembly" when referring to "مجلس الأمة" ("National Assembly").

If the translating machine can determine that the named entity is referring to "the House of Representatives", then, the machine can translate the named entity accurately as "the House". This can be done by comparing the shortened phrase with the rest of the named entity phrases of the same type. If the shortened phrase is found to be a sub-phrase of only one other phrase, then, it can be presumed that the shortened phrase is another reference to the same named entity. In that case, the counts of the longer phrase are used to re-rank the candidates of the shorter phrase.

Another possible re-scoring factor is based on contextual information in combination with the usage frequency information. Contextual information can be identified in the text input (e.g., the candidate re-ranker 370 can also us the Arabic document 330 as input), and searching the monolingual resource can involve searching multiple documents for the potential translations in conjunction with the contextual information to obtain the usage frequency information.

For some named entities, Web counts can lead to more accurate re-ranking of candidates when phrases are counted only if they appear within a certain context. For example, the top two translation candidates for "دونالد مارون" are "Donald Martin" and "Donald Marron". The straight Web counts are 2992 and 2509, respectively, which do not change the ranking of the candidates list. Web search engines can be used with the Boolean operator "AND" when searching the Web to generate a Web count based on context information. For the previous example, the fact that the person mentioned is the "CEO" of "Paine Webber" can be used in the search. This results in counts of 0 and 357 for "Donald Martin" and "Donald Marron", respectively. This is enough to get the correct translation as the top candidate.

Various techniques can be used to automatically find the contextual information that provides the most accurate counts. Some of these techniques use document-wide contextual information such as the title of the source document or select key terms mentioned in the source document. One way to identify those key terms is to use the TF/IDF (term frequency/inverse document frequency) measure. Other techniques use contextual information that is local to the named entity in question such as the n words that precede and/or succeed the named entity or other named entities mentioned closely to the one in question.

In addition to the techniques described above, a named entity translation system can also use various techniques to extend the candidates list generated by a potential translations generator, such as the candidate generator 300. Extending the candidates list can make the system more robust and effective. Once an initial list of potential translations has been generated, this list can be expanded by searching for the correct translation rather than generating it. By extrapolating from the initial candidates list, additional and sometimes better translations can be discovered.

Figure 6:
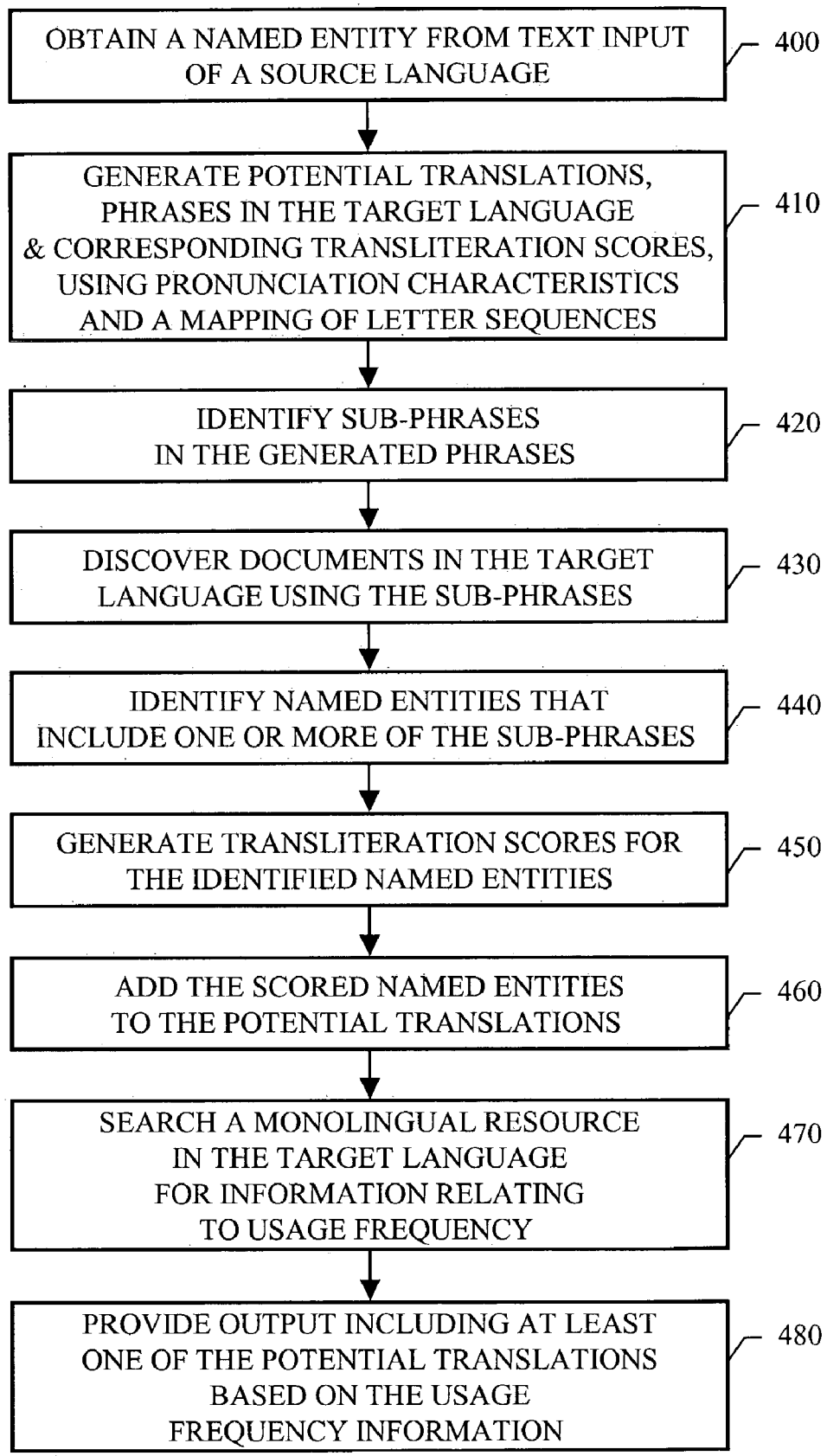
FIG. 6 illustrates machine-based production of potential translations for a named entity, including extending of a candidates list using sub-phrase identification.

FIG. 6 illustrates machine-based production of potential translations for a named entity, including extending of a candidates list using sub-phrase identification. A named entity is obtained from text input of a source language at 400. Potential translations for the named entity are generated with a probabilistic model that uses language pronunciation characteristics and a mapping of letter sequences from the target language into the source language at 410. The potential translations are phrases in the target language with corresponding transliteration scores, as described above.

Sub-phrases are identified in the generated phrases at 420. Documents in the target language are discovered using the sub-phrases at 430. This can involve using a Web search engine. Named entities that include one or more of the sub-phrases are identified in the discovered documents at 440. For example, the IdentiFinder named entity identifier can be used to find all named entities in the top n retrieved documents for each sub-phrase. Transliteration scores for the identified named entities in the discovered documents are generated using the probabilistic model at 450.

This scoring can be limited to the identified named entities in the retrieved target language documents that are in the same category (e.g., the PERSON category) as the original named entity in the source language input. The same models described above can be used for this scoring. These scored named entities are then added to the potential translations at 460. Thus, the candidates list is expanded based on sub-phrases found in the initial candidates list. This expanded candidates list then passes to the re-scoring process as before. A monolingual resource in the target language is searched for information relating to usage frequency at 470. Then, output including at least one of the potential translations is provided based on the usage frequency information at 480.

For a person name, this technique corresponds to searching for the first name and the last name separately during the generation of potential translations in order to augment the searching for the full name performed during the final re-scoring process. As an illustration, consider the name "كوفي عنان". The translation module proposes: "Coffee Annan", "Coffee Engen", "Coffee Anton", "Coffee Anyone", and "Covey Annan" but not the correct translation "Kofi Annan" (the current Secretary General of the United Nations). The list of potential translations can be expanded by finding the most common person names that have either one of "Coffee" or "Covey" as a first name, or "Annan", "Engen", "Anton", or "Anyone" as a last name.

If the monolingual resource to be used supports searching using wild cards, discovering the documents in the target language can be done using wild card searching. For example, if the monolingual resource used is a large English news corpus, such search capability is readily available. If the monolingual resource to be used does not support wild card searching, such as is common with typical Web search engines, the top n matching documents can be retrieved for each of the names "Coffee", "Covey", "Annan", "Engen", "Anton", and "Anyone". All person names found in the retrieved documents that contain any of the first or last names used in the search can then be added to the list of translation candidates. The correct translation may be among the names found in the retrieved documents, and if so, will likely rise to the top during the re-scoring process that is applied to the expanded candidates list. In this example, "Kofi Annan" is found and added to the candidate list, and it is subsequently ranked at the top.

To address cases where neither the correct translation nor any of its sub-phrases can be found in the list of translation candidates, additional potential translations can be generated by searching using context information such as described above in connection with the searching performed during the re-scoring process. This can be done by searching for a document in the target language that is similar to the one being translated from the source language. This can be especially useful when translating named entities in news stories of international importance where the same event will most likely be reported in many languages including the target language.

The extrapolation procedure described above can be repeated, but this time using contextual information, such as the title of the original document, to find similar documents in the target language. Additionally, a CLIR system can be used to find relevant documents more successfully.

Figure 7:
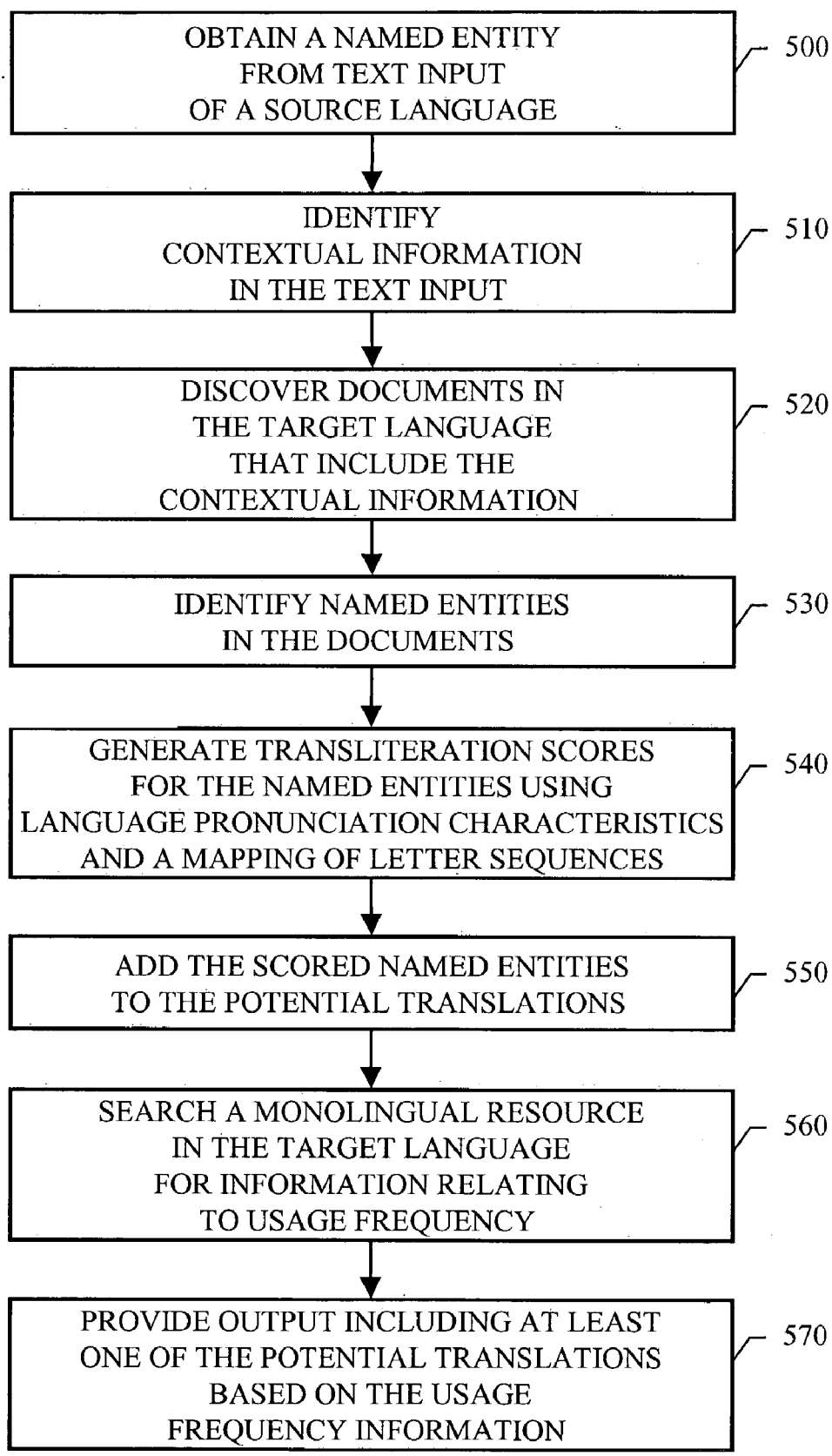
FIG. 7 illustrates machine-based production of potential translations for a named entity, including extending a candidates list using contextual information.

FIG. 7 illustrates machine-based production of potential translations for a named entity, including extending a candidates list using contextual information. A named entity is obtained from text input in a source language at 500. Contextual information, such as described above, is identified in the text input at 510. Documents in the target language that include the contextual information are discovered at 520. Named entities are identified in the documents at 530. Transliteration scores for the named entities in the documents are generated, in relation to the named entity in the text input, using a probabilistic model that uses language pronunciation characteristics and a mapping of letter sequences from the target language into the source language at 540.

The scored named entities are added to the potential translations at 550. A monolingual resource in the target language is searched for information relating to usage frequency at 560. Then, output including at least one of the potential translations is provided based on the usage frequency information at 570.

The logic flows depicted in FIGS. 3, 4, 6, and 7 do not require the particular order shown. Many variations in the order of steps are possible. Moreover, performing the steps in sequential order is not required, and in certain embodiments, multi-tasking and parallel processing may be preferable. Other embodiments may be within the scope of the following claims.

What is claimed is:

1. A method comprising:

obtaining a named entity from text input of a source language;

generating potential translations of the named entity from the source language to a target language using a pronunciation-based and spelling-based transliteration model using a first probabilistic model to generate words in the target language and first transliteration scores for the words based on language pronunciation characteristics, using a second probabilistic model to generate second transliteration scores for the words based on a mapping of letter sequences from the target language into the source language, and combining the first transliteration scores and the second transliteration scores into third transliteration scores for the words;

searching a monolingual resource in the target language for information relating to usage frequency; and providing output comprising at least one of the potential translations based on the usage frequency information.

2. The method of claim 1, wherein:

using the first probabilistic model comprises generating at least a portion of the words according to unigram probabilities P(w), generating phoneme sequences corresponding to the words with pronunciation probabilities P(e|w) and converting the phoneme sequences into the source language with conversion probabilities P(a|e), the first transliteration scores being governed by $$P_p(w|a) \cong \sum_{\forall e} P(w)P(e|w)P(a|e); \text{ and}$$

using the second probabilistic model comprises generating letters in the source language for the words using the letter sequences mapping with probabilities P(a|w), and generating at least a portion of the words according to a letter trigram model with extended probabilities P(w), the second transliteration scores being governed by $$P_s(w|a) \cong \sum_{\forall e} P(w)P(a|w).$$

3. The method of claim 2, wherein combining the first transliteration scores and the second transliteration scores comprises calculating a linear combination, the third transliteration scores being governed by $$P(w|a)=\lambda P_s(w|a)+(1-\lambda)P_p(w|a).$$

4. A method comprising:

obtaining a named entity from text input of a source language by obtaining phrase boundaries of the named entity and by obtaining a category of the named entity;

generating potential translations of the named entity from the source language to a target language using a pronunciation-based and spelling-based transliteration model, and selectively using a bilingual resource based on the category of the named entity;

searching a monolingual resource in the target language for information relating to usage frequency; and providing output comprising at least one of the potential translations based on the usage frequency information.

5. The method of claim 4, wherein selectively using the bilingual resource comprises: if the category comprises an organization or location name, translating one or more words in the named entity using a bilingual dictionary, transliterating the one or more words in the named entity using the pronunciation-based and spelling-based transliteration model, combining the translated one or more words with the transliterated one or more words into a regular expression defining available permutations of the translated one or more words and the transliterated one or more words, and matching the regular expression against a monolingual resource in the target language.

6. The method of claim 5, wherein combining the translated one or more words with the transliterated one or more words comprises combining the translated one or more words with n-best transliterations of the transliterated one or more words.

7. The method of claim 5, wherein matching the regular expression against the monolingual resource comprises generating scores for the potential translations according to:

$$P(e|f) = \alpha \sum_{\forall a} P(e, a|f)$$

-continued $$= \alpha \sum_{a_1=0}^{l} \cdots \sum_{a_m=0}^{l} \prod_{j=0}^{m} t(e_{a_j} | f_j)$$

where f is a phrase from the potential translations, e is a given word from the translated and transliterated words, l is the length of e, m is the length of f, a is a scaling factor based on a number of found matches for e, $a_j$ is an index of the target language word aligned with f according to an alignment a, and probability $t(e_{a_j}|f_j)$ is a linear combination of a transliteration score and a translation score, where the translation score is a uniform probability over all dictionary entries for $f_j$.

8. A method comprising:
obtaining a named entity from text input of a source language;
generating potential translations of the named entity from the source language to a target language using a pronunciation-based and spelling-based transliteration model;
searching a monolingual resource in the target language for information relating to usage frequency; and
providing output comprising at least one of the potential translations based on the usage frequency information and adjusting probability scores of the potential translations based on the usage frequency, wherein adjusting the probability scores comprises comparing the named entity with other named entities of a common type in the text input and, if the named entity is a sub-phrase of one of the other named entities, adjusting the probability scores based on normalized full-phrase hit counts corresponding to the one other named entity.

9. The method of claim 8, wherein providing the output further comprises selecting a translation of the named entity from the potential translations based on the adjusted probability scores.

10. The method of claim 8, wherein providing the output further comprises selecting a list of likely translations of the named entity from the potential translations based on the adjusted probability scores and a threshold.

11. The method of claim 8, wherein the usage frequency information comprises normalized full-phrase hit counts for the potential translations in the monolingual resource, and adjusting the probability scores comprises multiplying the probability scores by the normalized full-phrase hit counts for the potential translations.

12. The method of claim 8, further comprising identifying contextual information in the text input, and wherein searching the monolingual resource comprises searching multiple documents for the potential translations in conjunction with the contextual information to obtain the usage frequency information.

13. The method of claim 8, wherein searching the monolingual resource comprises searching multiple documents available over a communications network.

14. The method of claim 13, wherein the multiple documents comprise news stories in the target language.

15. The method of claim 14, wherein the target language is English.

16. The method of claim 15, wherein the source language is Arabic.

17. A method comprising:
obtaining a named entity from text input of a source language;
identifying contextual information in the text input;
generating potential translations of the named entity from the source language to a target language using a pronunciation-based and spelling-based transliteration model; by discovering documents in the target language that include the contextual information, identifying named entities in the documents, generating transliteration scores for the named entities in the documents, in relation to the named entity in the text input, using a probabilistic model that uses language pronunciation characteristics and a mapping of letter sequences from the target language into the source language, and adding the scored named entities to the potential translations;
searching a monolingual resource in the target language for information relating to usage frequency; and
providing output comprising at least one of the potential translations based on the usage frequency information.

18. A method comprising:
obtaining a named entity from text input of a source language;
generating potential translations of the named entity from the source language to a target language using a pronunciation-based and spelling-based transliteration model by generating phrases in the target language and corresponding transliteration scores with a probabilistic model that uses language pronunciation characteristics and a mapping of letter sequences from the target language into the source language, the potential translations comprising the scored phrases, identifying sub-phrases in the generated phrases, discovering documents in the target language using the sub-phrases, identifying, in the discovered documents, named entities that include one or more of the sub-phrases, generating transliteration scores for the identified named entities in the discovered documents using the probabilistic model, and adding the scored named entities to the potential translations;
searching a monolingual resource in the target language for information relating to usage frequency; and
providing output comprising at least one of the potential translations based on the usage frequency information.

19. A system comprising:
an input/output (I/O) system comprising a network interface configured to provide access to a monolingual resource;
a potential translations generator coupled with the I/O system, the potential translations generator incorporating a combined pronunciation-based and spelling-based transliteration model used to generate translation candidates for a named entity;
a re-ranker module configured to adjust scores of the translation candidates based on usage frequency information discovered in the monolingual resource using the network interface; and
a bilingual resource, wherein the potential translations generator selectively uses the bilingual resource based on a category of the named entity.

20. The system of claim 19, wherein the potential translations generator comprises:
- a person entity handling module;
- a location and organization entity handling module that accesses the bilingual resource; and
- a re-matcher module that accesses a news corpus to generate scores for translation candidates generated by the location and organization entity handling module.

21. The system of claim 19, wherein the re-ranker module incorporates multiple separate re-scoring modules that apply different re-scoring factors.

22. The system of claim 19, wherein the re-ranker module adjusts scores of the translation candidates based at least in part on context information corresponding to the named entity.

23. The system of claim 19, wherein the potential translations generator generates the translation candidates based at least in part on context information corresponding to the named entity.

24. A system comprising:
- an input/output (I/O) system; and
- a potential translations generator coupled with the I/O system, the potential translations generator incorporating a combined pronunciation-based and spelling-based transliteration model used to generate translation candidates for a named entity based at least in part on sub-phrases identified in an initial set of translation candidates.

25. The system of claim 24, wherein the potential translations generator generates the translation candidates based at least in part on context information corresponding to the named entity.

26. A system comprising:
- means for generating potential translations of a named entity from a source language to a target language using spelling-based transliteration the means for generating comprising means for selectively using a bilingual dictionary and a news corpus; and
- means for adjusting probability scores of the generated potential translations based on usage frequency information discovered in a monolingual resource.

27. The system of claim 26, wherein the means for adjusting comprises means for re-ranking the potential translations based on context information and identified sub-phrases of the potential translations.

* * * * *